US012776867B2

(12) United States Patent
Ugurlu et al.

(10) Patent No.: US 12,776,867 B2
(45) Date of Patent: Oct. 27, 2026

(54) CONFIGURED GRANTS WITH MULTIPLE TRANSMISSION OCCASIONS AND HARQ ID DETERMINATION

(71) Applicant: MediaTek Singapore Pte. Ltd., Singapore (SG)

(72) Inventors: Ahmet Umut Ugurlu, Cambridge (GB); Ming-Yuan Cheng, Hsinchu (TW); Mehmet Kunt, Cambridge (GB); Pradeep Jose, Cambridge (GB); Mukesh Chouhan, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 297 days.

(21) Appl. No.: 18/439,887

(22) Filed: Feb. 13, 2024

(65) Prior Publication Data

US 2024/0283580 A1 Aug. 22, 2024

Related U.S. Application Data

(60) Provisional application No. 63/485,932, filed on Feb. 20, 2023.

(51) Int. Cl.
*H04W 72/12* (2023.01)
*H04L 1/1867* (2023.01)
*H04W 72/1268* (2023.01)

(52) U.S. Cl.
CPC ....... *H04L 1/1887* (2013.01); *H04W 72/1268* (2013.01)

(58) Field of Classification Search
CPC ......................... H04L 1/1822; H04W 72/1268
See application file for complete search history.

(56) References Cited

U.S. PATENT DOCUMENTS

2021/0084674 A1* 3/2021 Wei ....................... H04L 1/1822
2021/0219329 A1* 7/2021 Zhou ..................... H04L 1/1819
(Continued)

FOREIGN PATENT DOCUMENTS

WO 2023011272 A1 2/2023

OTHER PUBLICATIONS

European Patent Office, Search Report, Jul. 11, 2024, Germany.
(Continued)

*Primary Examiner* — Khalid W Shaheed
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The method may be performed by a UE. In certain configurations, the UE configures a Hybrid Automatic Repeat Request (HARQ) process identification (ID) determination mechanism for uplink transmission according to a plurality of parameters. The UE obtains, based on the HARQ process ID determination mechanism and the parameters, a HARQ process ID for each of a plurality of PUSCH transmission occasions. The UE performs an uplink transmission with the PUSCH transmission occasions identified by the HARQ process IDs. The parameters in the HARQ process ID determination mechanism include a parameter total-NrofOccasions-PerCGPeriod representing a total number of available PUSCH transmission occasions in a single configured grant (CG) period, and a parameter time-Gap-MultipleOccasions representing a time gap between two successive PUSCH transmission occasions.

20 Claims, 11 Drawing Sheets

(56) References Cited

U.S. PATENT DOCUMENTS

| | | | | |
|---|---|---|---|---|
| 2022/0210753 | A1 | 6/2022 | Tsai et al. | |
| 2022/0311558 | A1* | 9/2022 | Tsai | H04L 1/1614 |
| 2022/0322404 | A1* | 10/2022 | Kwak | H04W 72/1263 |

OTHER PUBLICATIONS

3GPP TSG RAN WG1 #112, R1-2301605, Athens, Greece, Feb. 27-Mar. 3, 2023, Agenda item: 9.10.1, Title: Discussion on XR capacity enhancements, Source: MediaTek Inc., Document for: Discussion and Decision.

* cited by examiner

CONFIGURED GRANTS WITH MULTIPLE TRANSMISSION OCCASIONS AND HARQ ID DETERMINATION

CROSS-REFERENCE TO RELATED APPLICATION(S)

This application claims the benefits of U.S. Provisional Application Ser. No. 63/485,932, entitled "CONFIGURED GRANTS WITH MULTIPLE TRANSMISSION OCCASIONS AND HARQ ID DETERMINATION" and filed on Feb. 20, 2023, which is expressly incorporated by reference herein in their entirety.

BACKGROUND

Field

The present disclosure relates generally to communication systems, and more particularly, to techniques of methods and apparatuses for configured grants (CGs) with multiple transmission occasions and Hybrid Automatic Repeat Request (HARQ) ID determination.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The method may be performed by a UE. In certain configurations, the UE configures a Hybrid Automatic Repeat Request (HARQ) process identification (ID) determination mechanism for uplink transmission according to a plurality of parameters. The UE obtains, based on the HARQ process ID determination mechanism and the parameters, a HARQ process ID for each of a plurality of PUSCH transmission occasions. The UE performs an uplink transmission with the PUSCH transmission occasions identified by the HARQ process IDs. The parameters in the HARQ process ID determination mechanism include a parameter total-NrofOccasions-PerCGPeriod representing a total number of available PUSCH transmission occasions in a single configured grant (CG) period, and a parameter time-Gap-MultipleOccasions representing a time gap between two successive PUSCH transmission occasions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
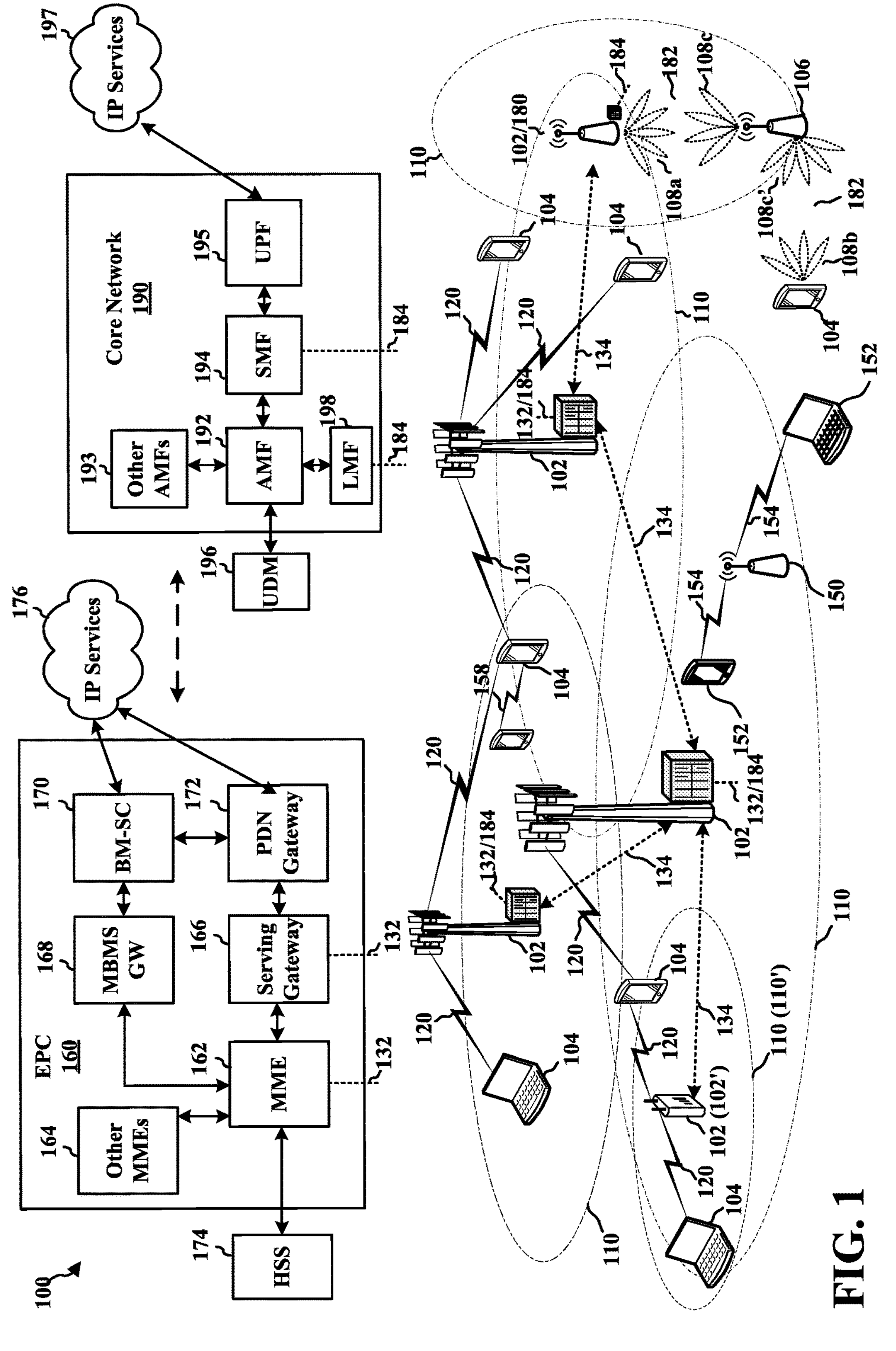
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage arcas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
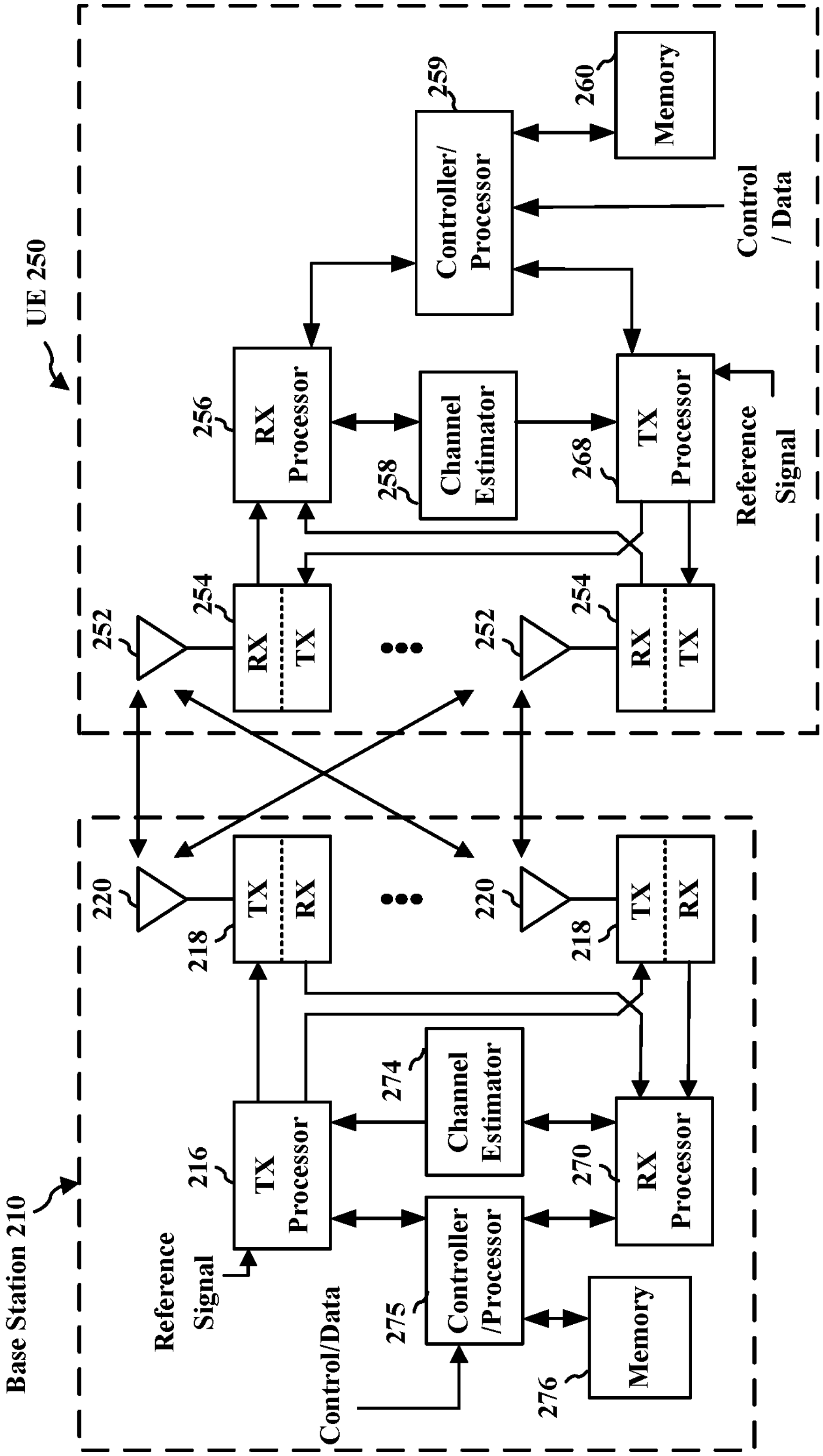
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical al channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
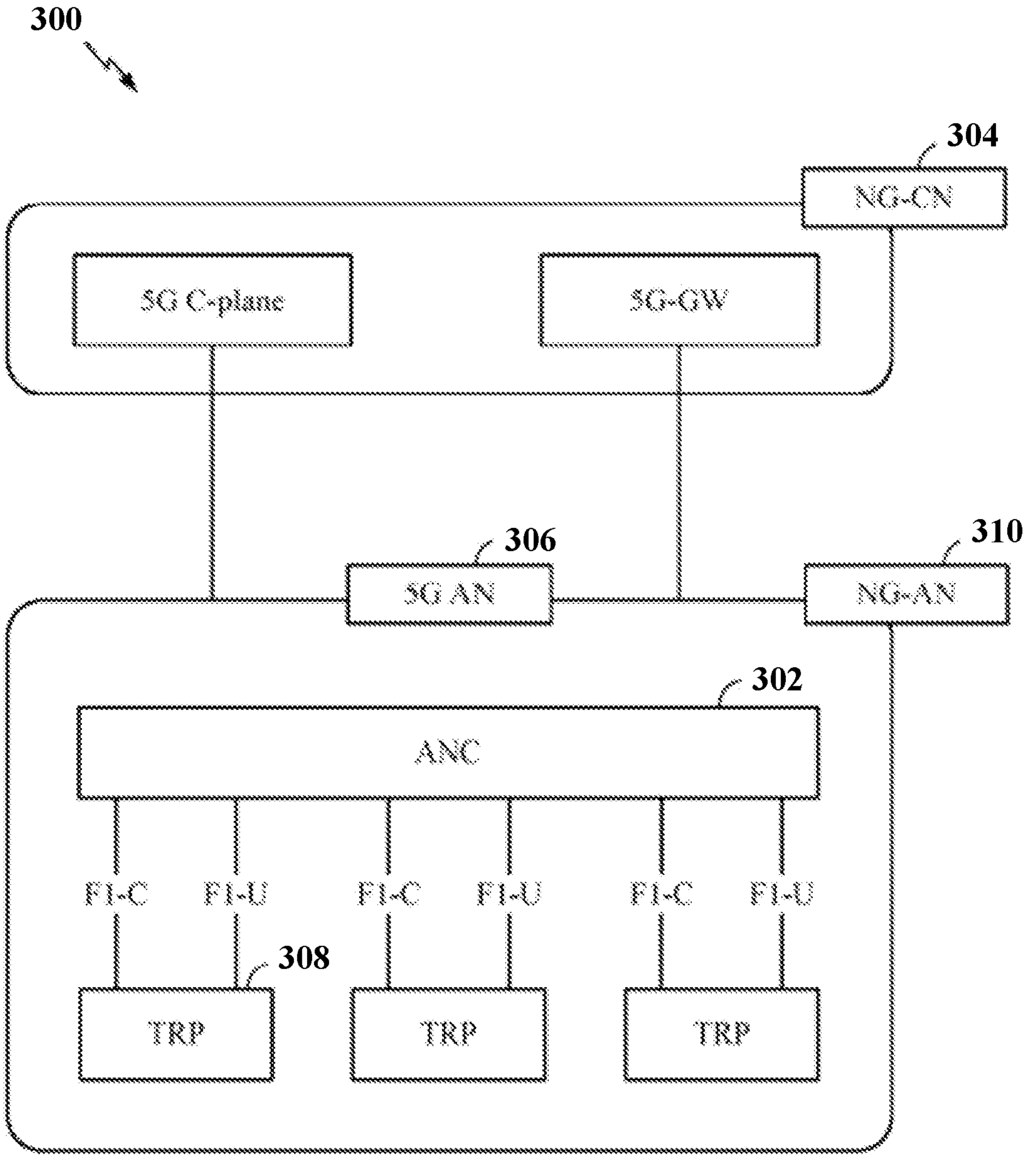
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
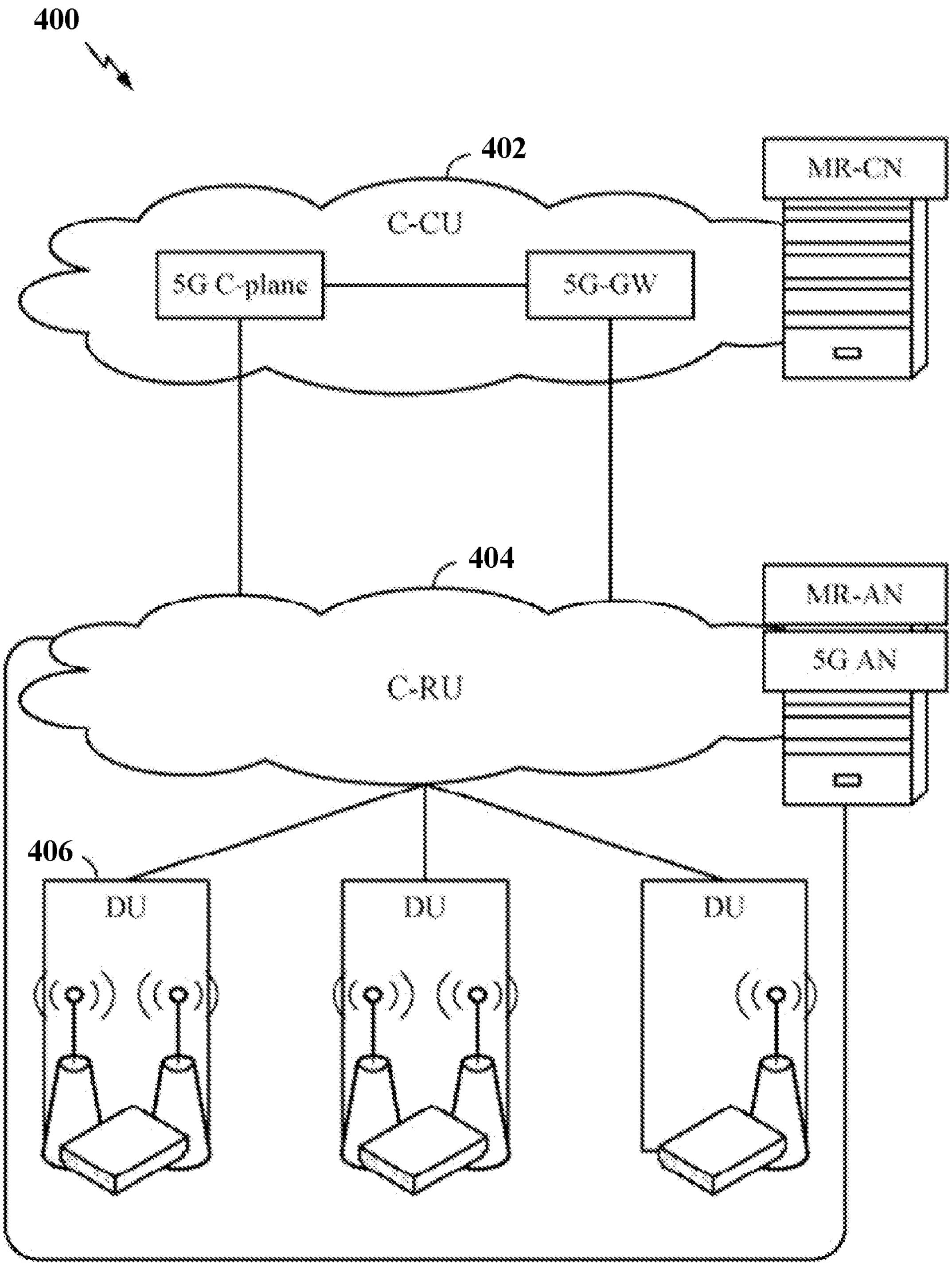
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
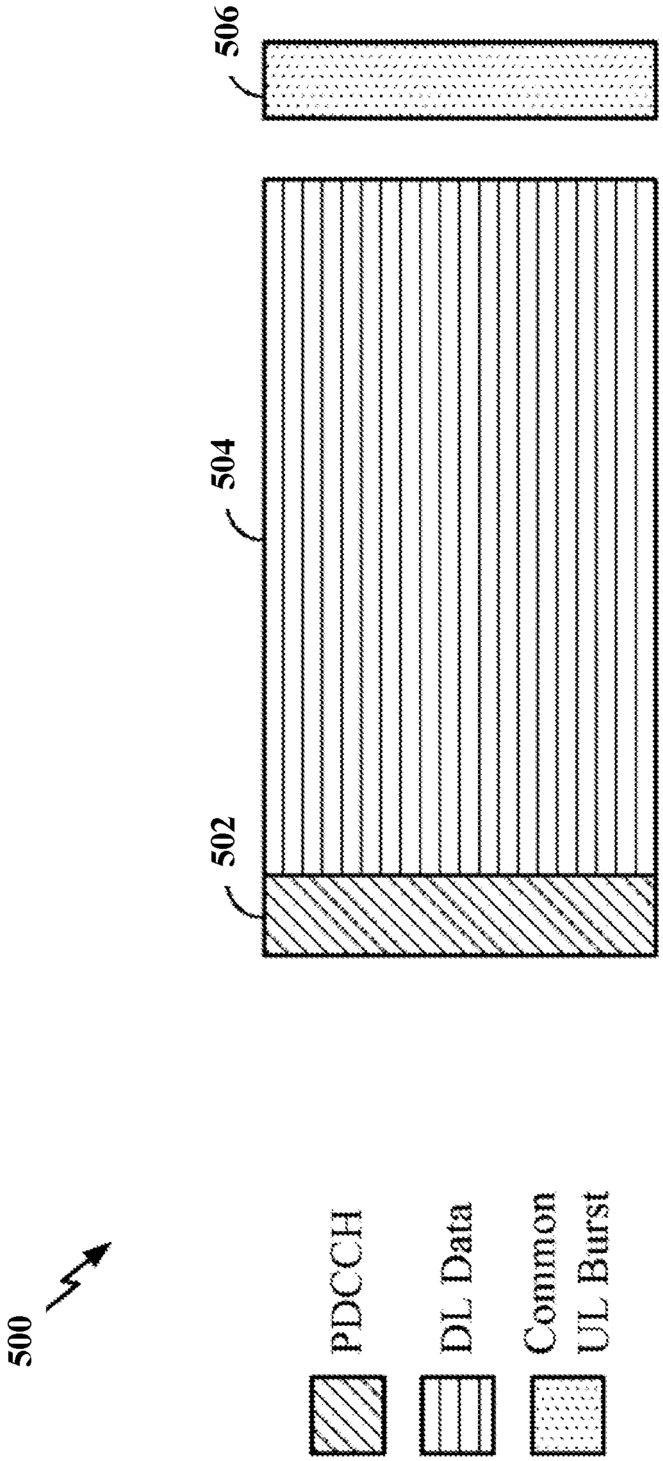
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
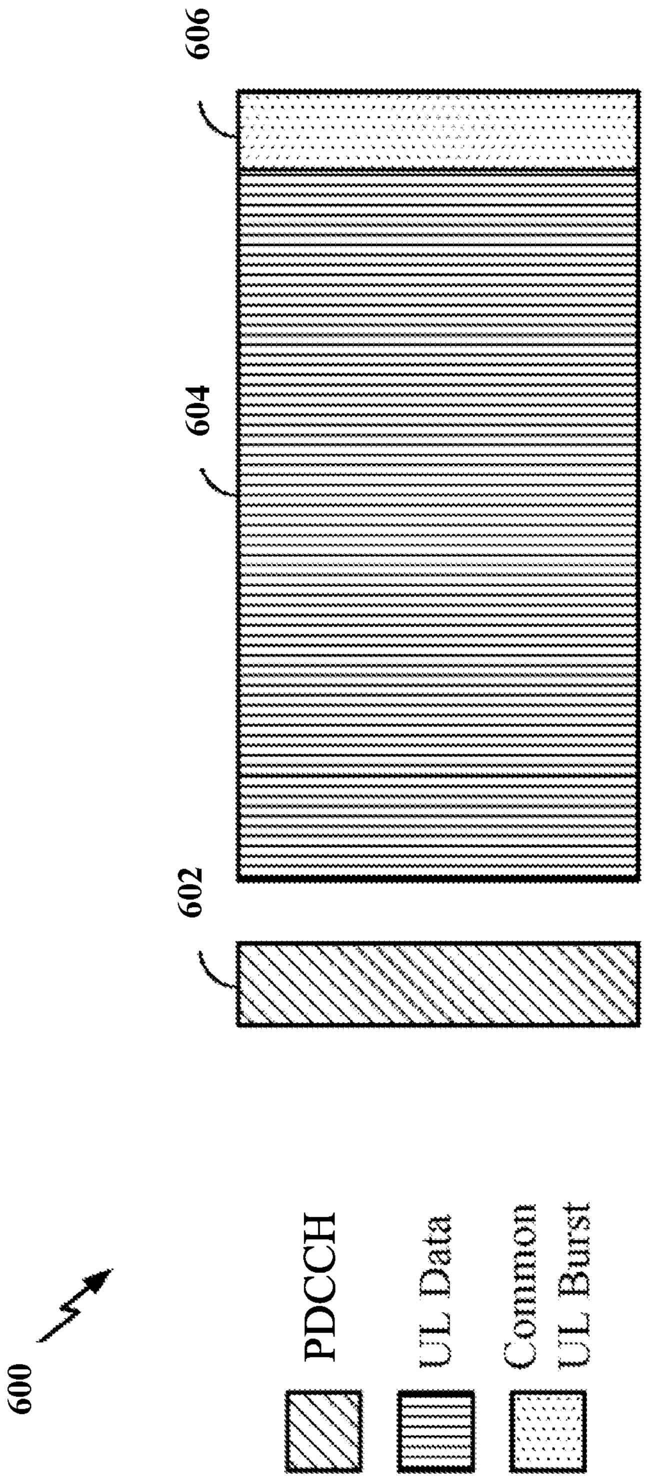
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Extended reality (XR) is an umbrella term for applications and services related to virtual reality (VR), augmented reality (AR), and cloud gaming. XR requires low latency and high reliability. Uplink video traffic characteristics include large periodically-arriving packets with varying sizes. One reason for varying packet sizes is related to video encoding algorithm. Due to low-latency requirements, NR uplink configured grant (CG) is a suitable resource allocation scheme in contrast to uplink dynamic grants. A user device (e.g., a UE) may transmit its uplink traffic on pre-configured resources without any prior scheduling request upon packet arrival.

Since XR system capacity is limited by large packets sizes and finite spectrum, efficient utilization of uplink resources is essential for viable operation of relevant XR applications with cellular connectivity. As the uplink packet size may vary significantly, configuring multiple Physical Uplink Shared Channel (PUSCH) transmission occasions per each single configured grant period may help optimize the amount of pre-occupied resources when coupled with a dynamic indication report of unused uplink resources.

Figure 7:
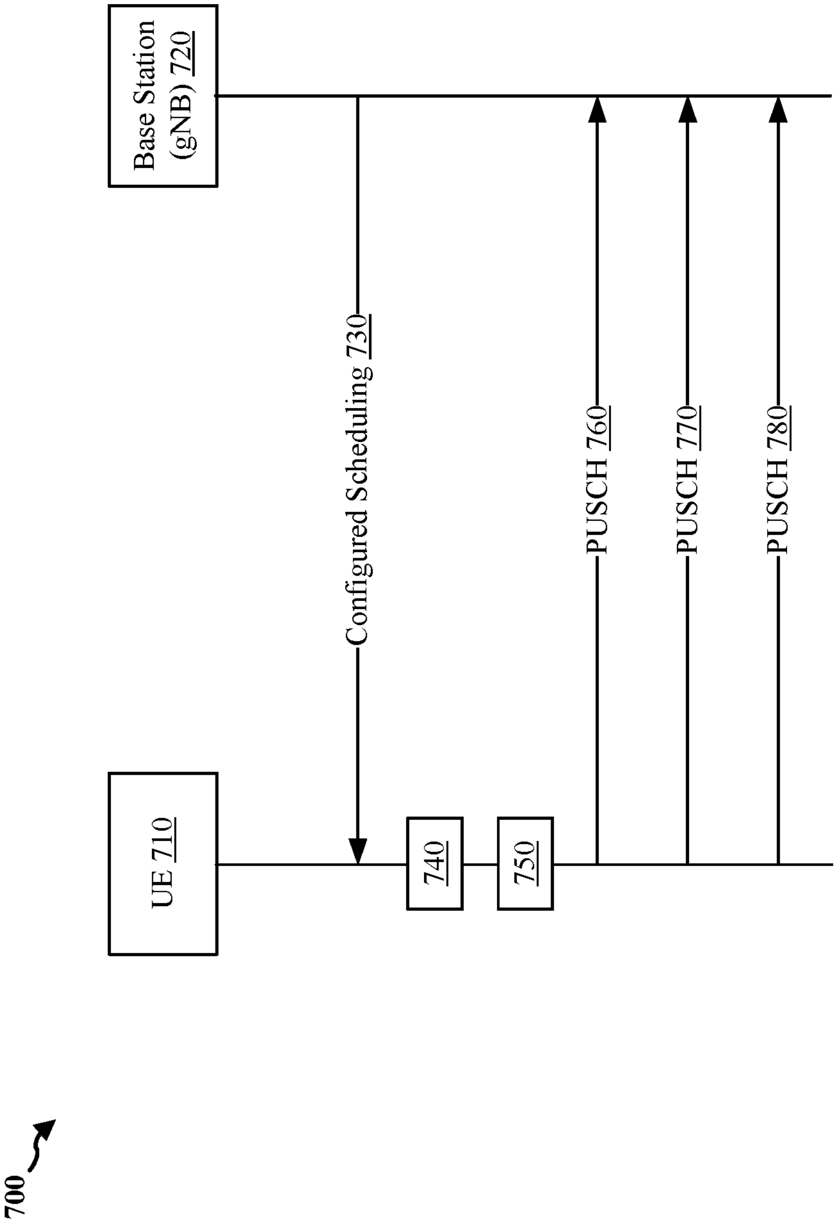
FIG. 7 is a diagram illustrating an example transmission procedure between a UE and a base station.

FIG. 7 is a diagram illustrating an example transmission procedure between a UE and a base station. As shown in FIG. 7, at operation 730, the base station 720 (e.g., gNB) sends configured scheduling information to the UE 710 to configure the UE 710 with parameters necessary for PUSCH and CG scheduling. In certain configurations, the base station 720 may send the configured scheduling information through RRC signaling. At operation 740, the UE 710 may configure the uplink transmissions according to the parameters in the configured scheduling information received from the base station 720. Specifically, the configured scheduling information indicating a HARQ process identification (ID) determination mechanism and corresponding parameters, such that the UE 710 may configure the uplink transmissions at operation 740 with the HARQ process ID determination mechanism according to the parameters. At operation 750, the UE 710 may obtain the HARQ process ID for each of a plurality of PUSCH transmission occasions to be transmitted based on the HARQ process ID determination mechanism and the parameters. Subsequently, at operations 760, 770 and 780 the UE 710 may perform the uplink transmission with the PUSCH transmission occasions using the HARQ process IDs obtained accordingly without any specific lower layer trigger, e.g., a downlink control information (DCI) dynamic trigger.

Currently, the 3GPP specifications provide an existing legacy HARQ process ID determination mechanism that allows one PUSCH transmission occasion in each CG period. Specifically, the legacy HARQ process ID determination for configured grants in Release-15/Release-16 involves a formula (1):

$$HARQ\ \text{Process}\ ID = \lfloor \text{floor}(\text{CURRENT\_symbol}/\text{periodicity}) \rfloor \bmod nrofHARQ\text{-Processes} \tag{1}$$

where the parameter CURRENT_symbol (which represents a current symbol index) may be obtained by a formula (2):

$$\text{CURRENT\_symbol} = (SFN \times numberOfSlotsPerFrame \times numberOfSymbolsPerSlot + \text{slot number in the frame} \times numberOfSymbolsPerSlot + \text{symbol number in the slot}) \tag{2}$$

In this case, the parameters used in the formulas (1) and (2) include: a parameter periodicity representing a periodicity in a single CG period, a parameter nrofHARQ-Processes representing a total number of the HARQ processes, and a parameter SFN representing the system frame number, which indicates an index number of the current CG frame. Specifically, the parameter periodicity may be obtained by multiplying a parameter numberOfSlotsPerFrame (which represents a total number of slots per CG frame) with a parameter memberOfSymbolsPerSlot (which represents a total number of symbols per slot). In certain configurations, the parameter memberOfSymbolsPerSlot may be obtained by a parameter subcarrier spacing (SCS), which represents the distance between two adjacent subcarriers in an Orthogonal Frequency Division Multiplexing (OFDM) signal that affects the bandwidth and performance of the network.

For example, in the scenario where each CG frame has one PUSCH transmission occasion at the start of the CG period, the CG periodicity is 20 ms (i.e., 20 slots in a single CG), the subcarrier spacing (SCS) is 15 KHz, and the uplink transmission include a total of 16 HARQ processes. In this case, the periodicity is 14 symbols×20 slots (=280 symbols), and the HARQ process ID for each PUSCH transmission occasion may be determined based on the legacy HARQ process ID determination by the formula (1) as:

$$HARQ\text{ Process }ID = \text{floor}[\text{CURRENT\_symbol}/(14\times 20)] \text{ mod } 16 \quad (3)$$

In this case, the first PUSCH transmission occasion (which is in the first CG frame and has the CURRENT_symbol=sym #0) would have ID #0, the second PUSCH transmission occasion (which is in the second CG frame and has the CURRENT_symbol=sym #14×20) has the HARQ process ID #1, and the third PUSCH transmission occasion (which is in the third CG frame and has the CURRENT_symbol=sym #28×20) has the HARQ process ID #2. The HARQ process IDs of subsequent PUSCH transmission occasions may also be obtained using the formula.

In the example using the legacy HARQ process ID determination formula, each CG frame has one PUSCH occasion. In some circumstances, system resource utilization efficiency may be optimized when the following features are introduced for uplink configured grants: (a) support for multiple PUSCH transmission occasions in each CG period, and (b) support for a dynamic indication mechanism of unused uplink CG resources from user device to network. In other words, the enhanced configured grant scheme allows each CG period to include multiple PUSCH occasions, where the number of PUSCH transmission occasions per CG period can be configurable. However, such enhanced configured grant scheme is not compatible with the existing legacy HARQ process ID determination mechanism, as the legacy HARQ process ID determination mechanism formula would result in all PUSCH transmission occasions in a single CG period to have the same HARQ process ID. Specifically, with Therefore, a new mechanism or enhancement over existing mechanisms may be needed to support these new configured grant features while maintaining common HARQ process ID understanding between user devices and the network. Such common understanding will ensure that any HARQ re-transmission resources can be signaled and granted as needed.

Referring back to FIG. 7, the configured scheduling information sent by the base station 720 may include information indicating the HARQ process ID determination mechanism and corresponding parameters. In certain configurations, when the configured scheduling information indicates that an enhanced HARQ process ID determination mechanism that allows each CG period to include multiple PUSCH transmission occasions is used, the UE 710 may configure the uplink transmissions with the corresponding parameters at operation 740 to implement the enhanced HARQ process ID determination mechanism according to the corresponding parameters. Specifically, with the enhanced HARQ process ID determination mechanism, the assigned HARQ process ID corresponding to each PUSCH transmission occasion should be incremented by 1 successively.

In certain configurations, the parameters in the configured scheduling information may include, without being limited thereto, a parameter total-NrofOccasions-PerOGPeriod representing a total number of available PUSCH transmission occasions in a single CG period, and a parameter time-Gap-Multiple Occasions representing a time gap between two successive PUSCH transmission occasions. In certain configurations, additional parameters involved in the enhanced HARQ process ID determination mechanism may further include a parameter CURRENT_occasion_index representing a current PUSCH transmission occasion index in a current CG period, a parameter position_in_CURRENT_OGperiod representing a current symbol position relative to a start of the current CG period, and/or a parameter PUSCH_TD_Alloc_Length representing a duration length of a single PUSCH transmission occasion.

In certain configurations, the enhanced HARQ process ID determination mechanism may utilize three different PUSCH positioning mechanisms with different time-domain patterns. In one embodiment, all PUSCH transmission occasions are positioned with a uniform time-domain pattern, such that the PUSCH transmission occasions in the corresponding CG period are positioned with uniform time intervals/gaps. In another embodiment, the PUSCH transmission occasions are positioned in the corresponding CG period in a back-to-back slots pattern, such that the first and the second PUSCH transmission occasions are positioned with a time interval/gap therebetween, while the remaining ones of the PUSCH transmission occasions are positioned in back-to-back slots. In yet another embodiment, the PUSCH transmission occasions are positioned in the corresponding CG period in a back-to-back slots pattern, such that the first and the second PUSCH transmission occasions are positioned with a time interval/gap therebetween, while the remaining ones of the PUSCH transmission occasions are positioned in back-to-back symbols. The embodiments are described hereinafter in details with respect to the accompanying drawing figures.

Figure 8:
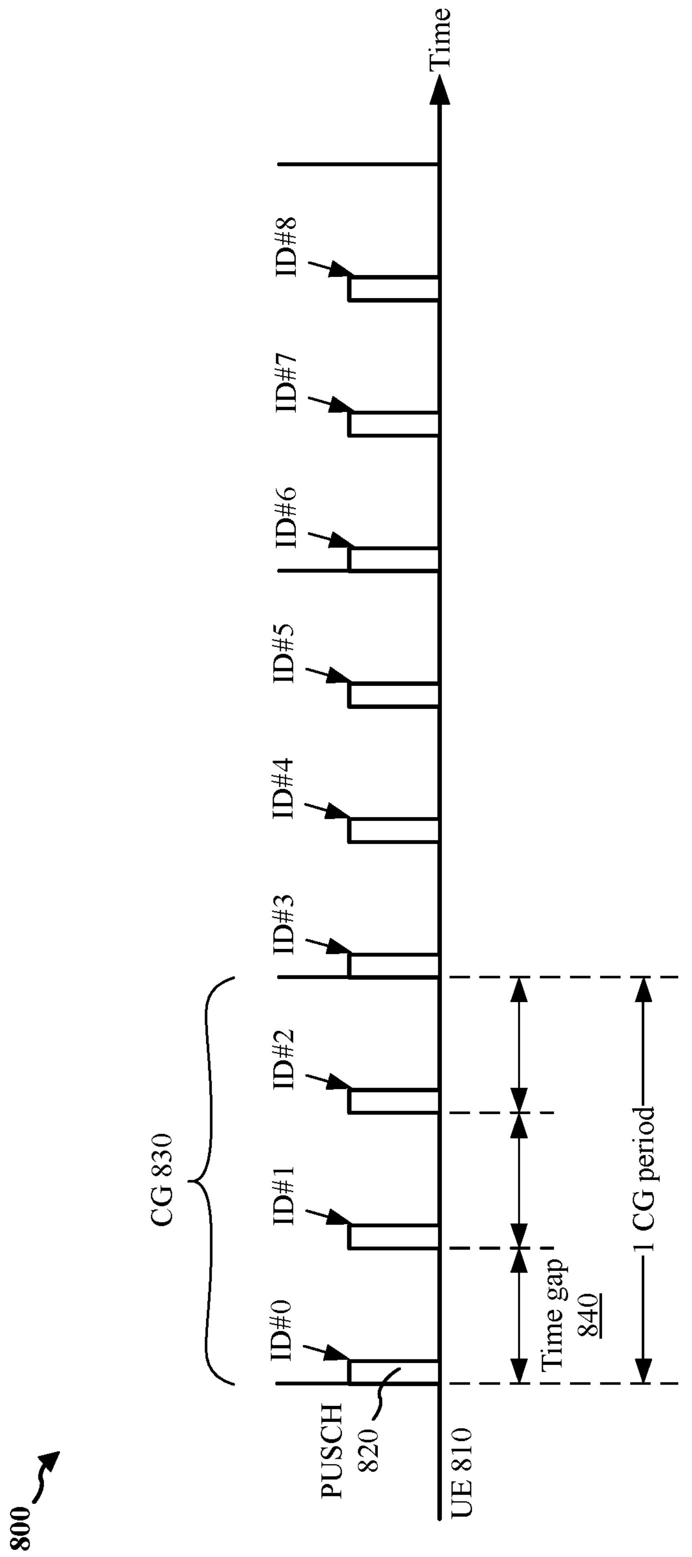
FIG. 8 is a diagram illustrating an example procedure of a UE obtaining HARQ process IDs for PUSCH transmission occasions, where multiple PUSCH transmission occasions are positioned in a single CG with a uniform time gap.

FIG. 8 is a diagram illustrating an example procedure of a UE obtaining HARQ process IDs for PUSCH transmission occasions. In certain configurations, the example procedure 800 applies to the embodiment with the uniform time-domain pattern, in which the PUSCH transmission occasions are positioned in the corresponding CG period with uniform time intervals/gaps. In this case, the UE 810 may configure the uplink transmissions using the parameter total-NrofOccasions-PerCGPeriod (which represent the total number of available PUSCH transmission occasions in a single CG period) and the parameter time-Gap-MultipleOccasions (which represents the time gap between two successive PUSCH transmission occasions). In the example procedure 800, multiple PUSCH transmission occasions 820 are positioned in a single CG 830 with a uniform time gap 840. Specifically, in each CG frame 830, the uniform time gap 840 is defined as a gap duration between any two successive PUSCH transmission occasions 820 in the single CG period. In this case, the HARQ process ID for each of the PUSCH transmission occasions is determined by a formula (4):

$$HARQ\ \text{Process}\ ID = [\text{total-}NrofOccasions\text{-}PerCGPeriod \times [\text{floor}(\text{CURRENT\_symbol/periodicity})] + \text{CURRENT\_occasion\_index}] \bmod nrofHARQ\text{-Processes} \quad (4)$$

where the parameter CURRENT_occasion_index is determined by formulas (5) and (6):

$$\text{CURRENT\_occasion\_index} = \text{position\_in\_CURRENT\_CGperiod} \bmod \text{time-Gap-}MultipleOccasions \quad (5)$$

$$\text{position\_in\_CURRENT\_CGperiod} = [\text{CURRENT\_symbol} - \text{floor}(\text{CURRENT\_symbol/periodicity}) \times \text{periodicity}] \quad (6)$$

where the parameters periodicity (which represents the periodicity in a single CG period) and nrofHARQ-Processes (which represents the total number of the HARQ processes) are identical to those in the legacy HARQ process ID determination mechanism.

As shown in FIG. 8, the parameter total-NrofOccasions-PerCGPeriod is 3, and in each CG frame 830, the parameter CURRENT_occasion_index for each of the 3 PUSCH transmission occasions 820 would be 0, 1 and 2, respectively. Thus, in the first CG frame 830, the HARQ process IDs for the 3 PUSCH transmission occasions 820 are 0, 1 and 2; in the second CG frame 830, the HARQ process IDs for the 3 PUSCH transmission occasions 820 are 3, 4 and 5; and in the third CG frame 830, the HARQ process IDs for the 3 PUSCH transmission occasions 820 are 6, 7 and 8. Thus, for all PUSCH transmission occasions 820, the assigned HARQ process ID corresponding to each PUSCH transmission occasion 820 is incremented by 1 successively.

Figure 9:
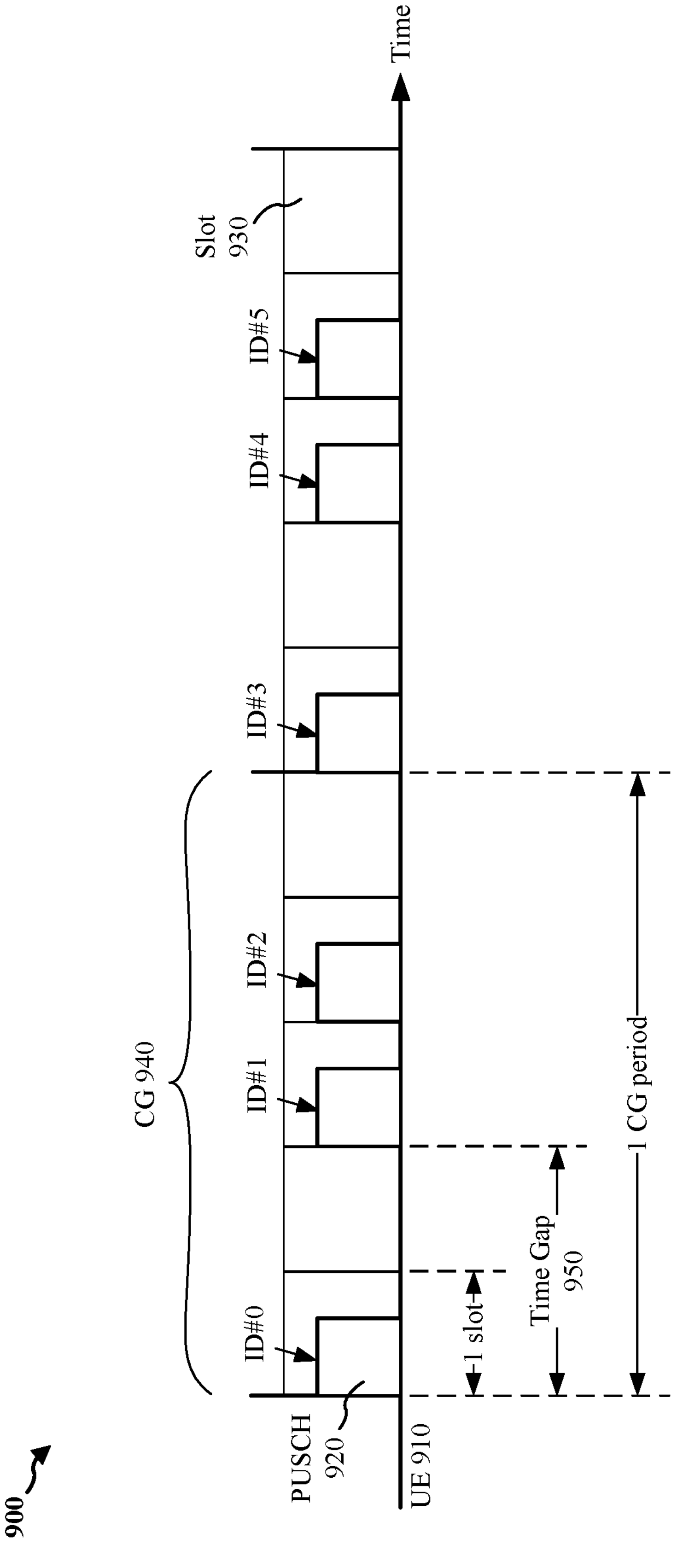
FIG. 9 is a diagram illustrating an example procedure of a UE obtaining HARQ process IDs for PUSCH transmission occasions, where multiple PUSCH transmission occasions are positioned in a single CG in a back-to-back slots pattern.

FIG. 9 is a diagram illustrating an example procedure of a UE obtaining HARQ process IDs for PUSCH transmission occasions. In certain configurations, the example procedure 900 applies to the embodiment with the back-to-back slots pattern, in which the first and the second PUSCH transmission occasions are positioned with a time interval/gap therebetween, while the remaining ones of the PUSCH transmission occasions are positioned in back-to-back slots. In this case, the UE 910 may configure the uplink transmissions using the parameter total-NrofOccasions-PerCGPeriod (which represent the total number of available PUSCH transmission occasions in a single CG period) and the parameter time-Gap-MultipleOccasions (which represents the time gap between two successive PUSCH transmission occasions). In the example procedure 900, multiple PUSCH transmission occasions 920 are positioned in a single CG 940 with slots 930. Specifically, in each CG frame 940, the first and the second PUSCH transmission occasions 920 are positioned with a time gap 950, and the remaining ones of the PUSCH transmission occasions (i.e., the second and third PUSCH transmission occasions 920) are positioned in back-to-back slots 930. It should be noted that the duration of each PUSCH transmission occasion 920 is shorter than the duration of each slot 930. In this case, the time gap 950 is defined as a gap duration between the first and the second PUSCH transmission occasions 920 in the single CG period. The HARQ process ID for each of the PUSCH transmission occasions is determined by a formula (7):

$$HARQ\ \text{Process}\ ID = [\text{total-}NrofOccasions\text{-}PerCGPeriod \times [\text{floor}(\text{CURRENT\_symbol/periodicity})] + \text{CURRENT\_occasion\_index}] \bmod nrofHARQ\text{-Processes} \quad (7)$$

where the parameter CURRENT_occasion_index is determined by formulas (8) to (10):

$$\text{CURRENT\_occasion\_index} = 0 \text{ if position\_in\_CURRENT\_CGperiod} < \text{time-Gap-}MultipleOccasions \quad (8)$$

$$\text{CURRENT\_occasion\_index} = \text{floor}[(\text{position\_in\_CURRENT\_CGperiod} - \text{time-Gap-}MultipleOccasions)/numberOfSymbolsPerSlot] \text{ if otherwise} \quad (9)$$

$$\text{position\_in\_CURRENT\_CGperiod} = [\text{CURRENT\_symbol} - \text{floor}(\text{CURRENT\_symbol/periodicity}) \times \text{periodicity}] \quad (10)$$

where the parameters periodicity (which represents the periodicity in a single CG period), nrofHARQ-Processes (which represents the total number of the HARQ processes) and memberOfSymbolsPerSlot (which represents the total number of symbols per slot) are identical to those in the legacy HARQ process ID determination mechanism.

As shown in FIG. 9, the parameter total-NrofOccasions-PerCGPeriod is 3, and in each CG frame 940, the parameter CURRENT_occasion_index for each of the 3 PUSCH transmission occasions 920 would be 0, 1 and 2, respectively. Thus, in the first CG frame 940, the HARQ process IDs for the 3 PUSCH transmission occasions 920 are 0, 1 and 2; and in the second CG frame 940, the HARQ process IDs for the 3 PUSCH transmission occasions 920 are 3, 4 and 5. Thus, for all PUSCH transmission occasions 920, the assigned HARQ process ID corresponding to each PUSCH transmission occasion 920 is incremented by 1 successively.

Figure 10:
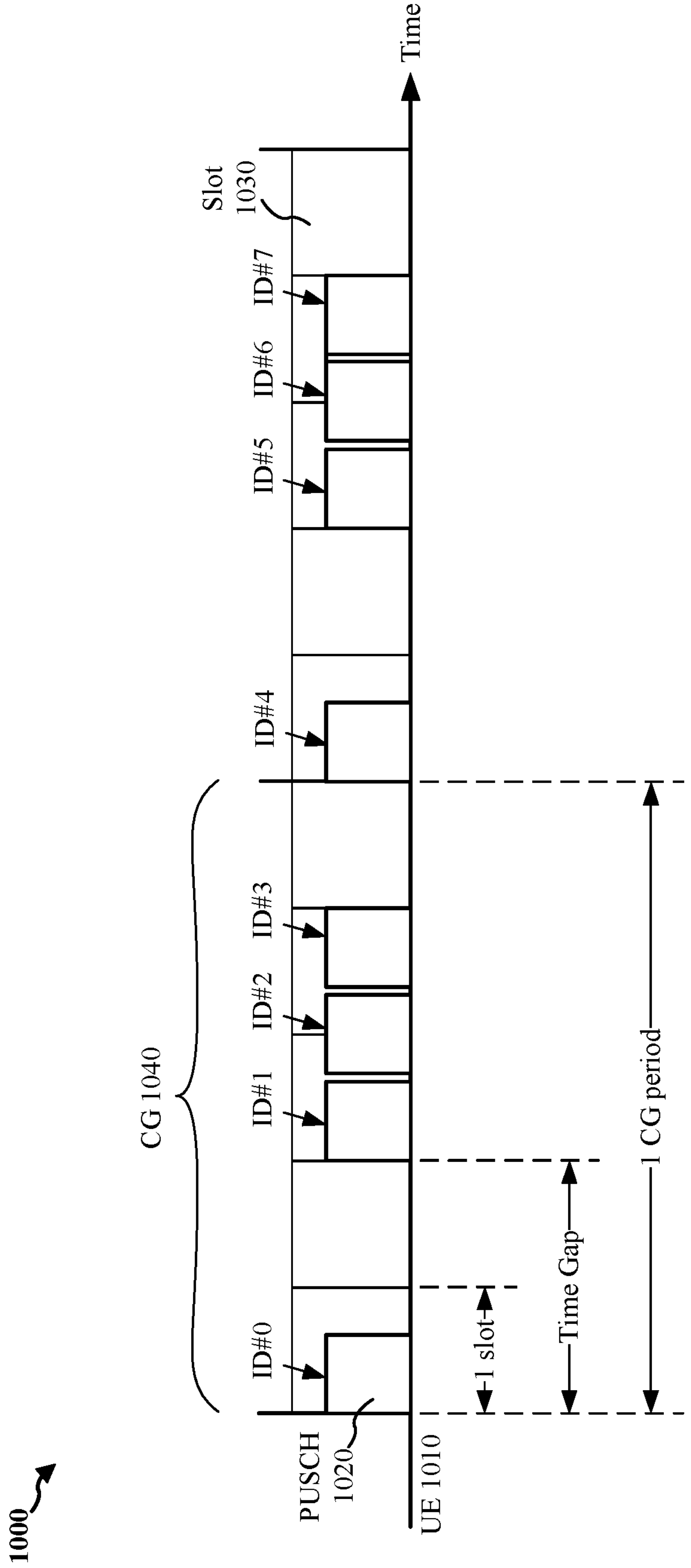
FIG. 10 is a diagram illustrating an example procedure of a UE obtaining HARQ process IDs for PUSCH transmission occasions, where multiple PUSCH transmission occasions are positioned in a single CG in a back-to-back symbols pattern.

FIG. 10 is a diagram illustrating an example procedure of a UE obtaining HARQ process IDs for PUSCH transmission occasions, where multiple PUSCH transmission occasions are positioned in a single CG in a back-to-back symbols pattern. In certain configurations, the example procedure 1000 applies to the embodiment with the back-to-back symbols pattern, in which the first and the second PUSCH transmission occasions are positioned with a time interval/gap therebetween, while the remaining ones of the PUSCH transmission occasions are positioned in back-to-back symbols. In this case, the UE 1010 may configure the uplink transmissions using the parameter total-NrofOccasions-PerCGPeriod (which represent the total number of available PUSCH transmission occasions in a single CG period), the parameter time-Gap-MultipleOccasions (which represents the time gap between two successive PUSCH transmission occasions), and the parameter PUSCH_TD_Alloc_Length (which represents the duration length of a single PUSCH transmission occasion). In the example procedure 1000, multiple PUSCH transmission occasions 1020 are positioned in a single CG 940 with slots 930. Specifically, in each CG frame 1040, the first and the second PUSCH transmission occasions 1020 are positioned with a time gap 1050, and the remaining ones of the PUSCH transmission occasions (i.e., the second, third and fourth PUSCH transmission occasions 1020) are positioned in back-to-back symbols in the slots 1030. It should be noted that the duration of each PUSCH transmission occasion 1020 is shorter than the duration of each slot 1030, allowing each slot 1030 to include more than one PUSCH transmission occasion 1020. In this case, the time gap 1050 is defined as a gap duration between the first and the second PUSCH transmission occasions 1020 in the single CG period. The HARQ process ID for each of the PUSCH transmission occasions is determined by a formula (11):

$$HARQ\ \text{Process}\ ID = \left[\text{total}-NrofOccasions-PerCGPeriod \times \left[\text{floor}(\text{CURRENT\_symbol/periodicity})\right] + \text{CURRENT\_occasion\_index}\right] \bmod nrofHARQ-\text{Processes} \quad (11)$$

where the parameter CURRENT_occasion_index is determined by formulas (12) to (14):

$$\text{CURRENT\_occasion\_index} = 0 \text{ if position\_in\_CURRENT\_CGperiod} < \text{time}-\text{Gap}-MultipleOccasions \quad (12)$$

$$\text{CURRENT\_occasion\_index} = \text{floor}\left[(\text{position\_in\_CURRENT\_CGperiod} - \text{time}-\text{Gap}-MultipleOccasions)/\text{PUSCH\_TD\_Alloc\_Length}\right] \text{ if otherwise} \quad (13)$$

$$\text{position\_in\_CURRENT\_CGperiod} = \left[\text{CURRENT\_symbol} - \text{floor}(\text{CURRENT\_symbol/periodicity}) \times \text{periodicity}\right] \quad (14)$$

where the parameters periodicity (which represents the periodicity in a single CG period) and nrofHARQ-Processes (which represents the total number of the HARQ processes) are identical to those in the legacy HARQ process ID determination mechanism.

As shown in FIG. 10, the parameter total-NrofOccasions-PerCGPeriod is 4, and in each CG frame 1040, the parameter CURRENT_occasion_index for each of the 4 PUSCH transmission occasions 1020 would be 0, 1, 2 and 3, respectively. Thus, in the first CG frame 1040, the HARQ process IDs for the 4 PUSCH transmission occasions 1020 are 0, 1, 2 and 3; and in the second CG frame 1040, the HARQ process IDs for the 4 PUSCH transmission occasions 920 are 4, 5, 6 and 7. Thus, for all PUSCH transmission occasions 1020, the assigned HARQ process ID corresponding to each PUSCH transmission occasion 1020 is incremented by 1 successively.

In the example procedure 1000, the parameter PUSCH_TD_Alloc_Length is used as one of the parameters for the enhanced HARQ process ID determination mechanism. In one embodiment, the parameter PUSCH_TD_Alloc_Length may be one of the parameters in the configured scheduling information sent by the base station (e.g., the base station 720) to the UE 1010 by RRC signaling, allowing the UE 1010 to pre-configure the parameter. In an alternative embodiment, the parameter PUSCH_TD_Alloc_Length may be dynamically indicated by the base station via DCI signaling, allowing the parameter PUSCH_TD_Alloc_Length to be dynamically configured.

It should be noted that, in the example procedures 800, 900 and 1000, the total number of available PUSCH transmission occasions in a single CG period (3 in examples procedures 800 and 900, and 4 in example procedure 1000) are merely provided for simplified illustration purposes, and the actual total number of available PUSCH transmission occasions in a single CG period in each embodiment may be different.

In certain configurations, in addition to the parameters as discussed above, the parameters in the configured scheduling information may further include an offset parameter harq-ProcID-Offset2. In this case, the HARQ process ID for each of the PUSCH transmission occasions is determined by a formula (15):

$$HARQ\ \text{Process}\ ID = \left[\text{total}-NrofOccasions-PerCGPeriod \times \left[\text{floor}(\text{CURRENT\_symbol/periodicity})\right] + \text{CURRENT\_occasion\_index}\right] \bmod \left(nrofHARQ-\text{Processes} + harq-ProcID-Offset2\right) \quad (15)$$

where the parameter CURRENT_occasion_index may be determined using the formulas (5) and (6), by formulas (8) to (10), or by formulas (12) to (14) as discussed in the embodiments shown in FIGS. 8-10.

Figure 11:
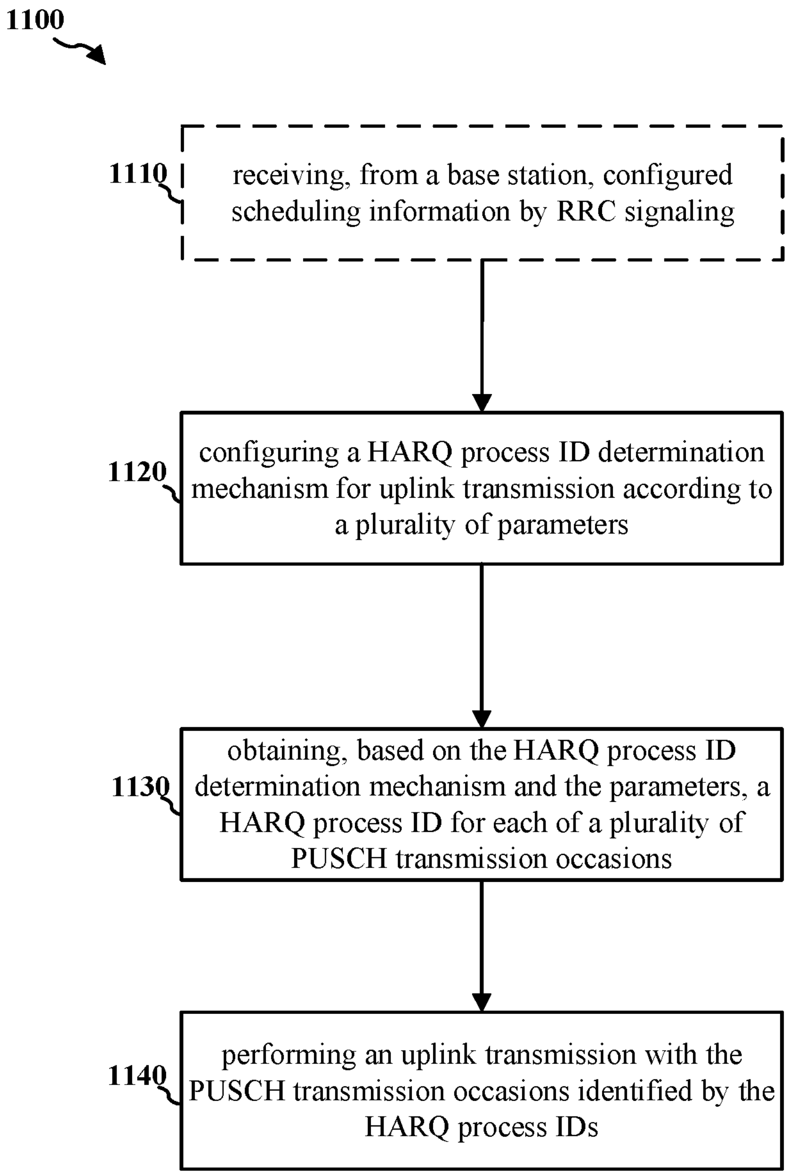
FIG. 11 is a flow chart of a method (process) for wireless communication of a UE.

FIG. 11 is a flow chart of a method (process) for wireless communication of a UE. The method may be performed by a UE (e.g., the UE 710, 810, 910 and/or 1010). Optionally, at operation 1110, the UE receives, from a base station, configured scheduling information by RRC signaling, and the configured scheduling information includes the parameters in a HARQ process ID determination mechanism and information indicating the HARQ process ID determination mechanism. At operation 1120, the UE configures the HARQ process ID determination mechanism for uplink transmission according to the parameters. At operation 1130, the UE obtains, based on the HARQ process ID determination mechanism and the parameters, a HARQ process ID for each of a plurality of PUSCH transmission occasions. At operation 1140, the UE performs an uplink transmission with the PUSCH transmission occasions identified by the HARQ process IDs. The parameters in the HARQ process ID determination mechanism include a parameter total-NrofOccasions-PerCGPeriod representing a total number of available PUSCH transmission occasions in a single configured grant (CG) period, and a parameter time-Gap-MultipleOccasions representing a time gap between two successive PUSCH transmission occasions.

In certain embodiments, the available PUSCH transmission occasions are positioned in the single CG period with the time gap as a uniform time gap, and the uniform time gap is defined as a gap duration between any two successive PUSCH transmission occasions in the single CG period.

In certain embodiments, the available PUSCH transmission occasions are positioned in the single CG period by: positioning a first PUSCH transmission occasion and a second PUSCH transmission occasion with the time gap therebetween; and positioning the second PUSCH transmission occasion and remaining ones of the available PUSCH transmission occasions in back-to-back slots in the single CG period.

In certain embodiments, the available PUSCH transmission occasions are positioned in the single CG period by: positioning a first PUSCH transmission occasion and a second PUSCH transmission occasion with the time gap therebetween; and positioning the second PUSCH transmission occasion and remaining ones of the available PUSCH transmission occasions in back-to-back symbols in the single CG period.

In certain embodiments, the parameters in the HARQ process ID determination mechanism further include a parameter PUSCH_TD_Alloc_Length representing a duration length of a single PUSCH transmission occasion. In certain embodiments, the UE may receive, from a base station, the parameter PUSCH_TD_Alloc_Length via DCI signaling.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

configuring a Hybrid Automatic Repeat Request (HARQ) process identification (ID) determination mechanism for uplink transmission according to a plurality of parameters;

obtaining, based on the HARQ process ID determination mechanism and the parameters, a HARQ process ID for each of a plurality of Physical Uplink Shared Channel (PUSCH) transmission occasions; and performing an uplink transmission with the PUSCH transmission occasions identified by the HARQ process IDs, wherein the parameters in the HARQ process ID determination mechanism include a parameter total-NrofOccasions-PerCGPeriod representing a total number of available PUSCH transmission occasions in a single configured grant (CG) period, and a parameter timeGap-MultipleOccasions representing a time gap between two successive PUSCH transmission occasions.

2. The method of claim 1, further comprising:

receiving, from a base station, configured scheduling information by radio resource control (RRC) signaling, wherein the configured scheduling information includes the parameters in the HARQ process ID determination mechanism and information indicating the HARQ process ID determination mechanism.

3. The method of claim 1, wherein the HARQ process ID for each of the PUSCH transmission occasions is determined by:

HARQ Process ID=[total-NrofOccasions-PerCGPeriod×[floor(CURRENT_symbol/periodicity)]+CURRENT_occasion_index] mod nrofHARQ-Processes, wherein CURRENT_occasion_index is a parameter representing a current PUSCH transmission occasion index in a current CG period, CURRENT_symbol represents a current symbol index, periodicity represents a periodicity in the single CG period, and nrofHARQ-Processes represents a total number of HARQ processes in the uplink transmission.

4. The method of claim 3, wherein the available PUSCH transmission occasions are positioned in the single CG period with the time gap as a uniform time gap, and the uniform time gap is defined as a gap duration between any two successive PUSCH transmission occasions in the single CG period.

5. The method of claim 4, wherein the parameter CURRENT_occasion_index is determined by:

CURRENT_occasion_index=position_in_CURRENT_CGperiod mod time-Gap-Multiple Occasions, and position_in_CURRENT_CGperiod=[CURRENT_symbol−floor(CURRENT_symbol/periodicity)×periodicity], wherein position_in_CURRENT_CGperiod represents a current symbol position relative to a start of the current CG period.

6. The method of claim 3, wherein the available PUSCH transmission occasions are positioned in the single CG period by:

positioning a first PUSCH transmission occasion and a second PUSCH transmission occasion with the time gap therebetween; and positioning the second PUSCH transmission occasion and remaining ones of the available PUSCH transmission occasions in back-to-back slots in the single CG period.

7. The method of claim 6, wherein the parameter CURRENT_occasion_index is determined by:

CURRENT_occasion_index=0 if position_in_CURRENT_CGperiod<time-Gap-Multiple Occasions, or CURRENT_occasion_index=floor[(position_in_CURRENT_CGperiod-time-Gap-Multiple Occasions)/numberOfSymbolsPerSlot] if otherwise, wherein memberOfSymbolsPerSlot represents a total number of symbols per slot, position_in_CURRENT_CGperiod represents a current symbol position relative to a start of the current CG period, and position_in_CURRENT_CGperiod=[CURRENT_symbol−floor(CURRENT_symbol/periodicity)×periodicity].

8. The method of claim 3, wherein the available PUSCH transmission occasions are positioned in the single CG period by:

positioning a first PUSCH transmission occasion and a second PUSCH transmission occasion with the time gap therebetween; and positioning the second PUSCH transmission occasion and remaining ones of the available PUSCH transmission occasions in back-to-back symbols in the single CG period.

9. The method of claim 8, wherein the parameter CURRENT_occasion_index is determined by:

CURRENT_occasion_index=0 if position_in_CURRENT_CGperiod time-Gap-Multiple Occasions, or CURRENT_occasion_index=floor [(position_in_CURRENT_CGperiod−time-Gap-Multiple Occasions)/PUSCH_TD_Alloc_Length] if otherwise, wherein PUSCH_TD_Alloc_Length is a parameter representing a duration length of a single PUSCH transmission occasion, position_in_CURRENT_CGperiod represents a current symbol position relative to a start of the current CG period, and position_in_CURRENT_CGperiod=[CURRENT_symbol−floor(CURRENT_symbol/periodicity)×periodicity].

10. The method of claim 9, further comprising:

receiving, from a base station, configured scheduling information by radio resource control (RRC) signaling, wherein the configured scheduling information includes the parameters in the HARQ process ID determination mechanism and information indicating the HARQ process ID determination mechanism, and the parameters further include the parameter PUSCH_TD_Alloc_Length.

11. The method of claim 9, further comprising:

receiving, from a base station, the parameter PUSCH_TD_Alloc_Length via downlink control information (DCI) signaling.

12. The method of claim 1, wherein the parameters further include an offset parameter harq-ProcID-Offset2, and the HARQ process ID for each of the PUSCH transmission occasions is determined by:

HARQ Process ID=[total-NrofOccasions-PerCGPeriod×[floor(CURRENT_symbol/periodicity)]+CURRENT_occasion_index] mod (nrofHARQ-Processes+harq-ProcID-Offset2), wherein CURRENT_occasion_index is a parameter representing a current PUSCH transmission occasion index in a current CG period, CURRENT_symbol represents a current symbol index, periodicity represents a periodicity in the single CG period, and nrofHARQ-Processes represents a total number of HARQ processes in the uplink transmission.

13. An apparatus for wireless communication, the apparatus being a user equipment (UE), comprising:

a memory; and at least one processor coupled to the memory and configured to:

configure a Hybrid Automatic Repeat Request (HARQ) process identification (ID) determination mechanism for uplink transmission according to a plurality of parameters, wherein the parameters include a parameter total-NrofOccasions-PerCGPeriod representing a total number of available PUSCH transmission occasions in a single configured grant (CG) period, and a parameter time-Gap-MultipleOccasions representing a time gap between two successive PUSCH transmission occasions;

obtain, based on the HARQ process ID determination mechanism and the parameters, a HARQ process ID for each of a plurality of Physical Uplink Shared Channel (PUSCH) transmission occasions; and perform an uplink transmission with the PUSCH transmission occasions identified by the HARQ process IDs.

14. The apparatus of claim 13, wherein the HARQ process ID for each of the PUSCH transmission occasions is determined by:

HARQ Process ID=[total-NrofOccasions-PerCGPeriod×[floor(CURRENT_symbol/periodicity)]+CURRENT_occasion_index] mod nrofHARQ-Processes, wherein CURRENT_occasion_index is a parameter representing a current PUSCH transmission occasion index in a current CG period, CURRENT_symbol represents a current symbol index, periodicity represents a periodicity in the single CG period, and nrofHARQ-Processes represents a total number of HARQ processes in the uplink transmission.

15. The apparatus of claim 14, wherein the available PUSCH transmission occasions are positioned in the single CG period with the time gap as a uniform time gap, and the uniform time gap is defined as a gap duration between any two successive PUSCH transmission occasions in the single CG period.

16. The apparatus of claim 15, wherein the parameter CURRENT_occasion_index is determined by:

CURRENT_occasion_index=position_in_CURRENT_CGperiod mod time-Gap-Multiple Occasions, and position_in_CURRENT_CGperiod=[CURRENT_symbol−floor(CURRENT_symbol/periodicity)×periodicity], wherein position_in_CURRENT_CGperiod represents a current symbol position relative to a start of the current CG period.

17. The apparatus of claim 14, wherein the available PUSCH transmission occasions are positioned in the single CG period by:

positioning a first PUSCH transmission occasion and a second PUSCH transmission occasion with the time gap therebetween; and positioning the second PUSCH transmission occasion and remaining ones of the available PUSCH transmission occasions in back-to-back slots in the single CG period.

18. The apparatus of claim 17, wherein the parameter CURRENT_occasion_index is determined by:

CURRENT_occasion_index=0 if position_in_CURRENT_CGperiod<time-Gap-Multiple Occasions, or CURRENT_occasion_index=floor[(position_in_CURRENT_CGperiod−time-Gap-Multiple Occasions)/mumberOfSymbolsPerSlot] if otherwise, wherein numberOfSymbolsPerSlot represents a total number of symbols per slot, position_in_CURRENT_CGperiod represents a current symbol position relative to a start of the current CG period, and position_in_CURRENT_CGperiod=[CURRENT_symbol−floor(CURRENT_symbol/periodicity)×periodicity].

19. The apparatus of claim 14, wherein the available PUSCH transmission occasions are positioned in the single CG period by:

positioning a first PUSCH transmission occasion and a second PUSCH transmission occasion with the time gap therebetween; and positioning the second PUSCH transmission occasion and remaining ones of the available PUSCH transmission occasions in back-to-back symbols in the single CG period.

20. The apparatus of claim 19, wherein the parameter CURRENT_occasion_index is determined by:

CURRENT_occasion_index=0 if position_in_CURRENT_CGperiod<time-Gap-Multiple Occasions, or CURRENT_occasion_index=floor[(position_in_CURRENT_CGperiod−time-Gap-Multiple Occasions)/PUSCH_TD_Alloc_Length] if otherwise, wherein PUSCH_TD_Alloc_Length is a parameter representing a duration length of a single PUSCH transmission occasion, position_in_CURRENT_CGperiod represents a current symbol position relative to a start of the current CG period, and position_in_CURRENT_CGperiod=[CURRENT_symbol−floor(CURRENT_symbol/periodicity)×periodicity].

* * * * *